US006419496B1

United States Patent
Vaughan, Jr.

(10) Patent No.: US 6,419,496 B1
(45) Date of Patent: Jul. 16, 2002

(54) LEARNING METHOD

(76) Inventor: William Vaughan, Jr., 207 South Rd., Chebeague Island, ME (US) 04017

(*) Notice: Subject to any disclaimer, the term of this patent is extended or adjusted under 35 U.S.C. 154(b) by 0 days.

(21) Appl. No.: 09/535,883

(22) Filed: Mar. 28, 2000

(51) Int. Cl.[7] .................................................. G09B 7/00
(52) U.S. Cl. .................... 434/322; 434/323; 434/118
(58) Field of Search ................................ 434/322, 323, 434/350, 118

(56) References Cited

U.S. PATENT DOCUMENTS

| | | | | |
|---|---|---|---|---|
| 5,059,127 A | * | 10/1991 | Lewis et al. | 434/353 X |
| 5,310,349 A | | 5/1994 | Daniels et al. | |
| 5,577,919 A | | 11/1996 | Collins et al. | |
| 5,692,906 A | * | 12/1997 | Corder | 434/156 X |
| 5,727,950 A | | 3/1998 | Cook et al. | |
| 5,727,951 A | | 3/1998 | Ho et al. | |
| 5,810,605 A | * | 9/1998 | Siefert | 434/362 X |
| 5,904,485 A | | 5/1999 | Siefert | |
| 6,022,221 A | * | 1/2000 | Boon | 434/156 X |
| 6,039,575 A | * | 3/2000 | L'Allier et al. | 434/323 X |
| 6,201,948 B1 | * | 3/2001 | Cook et al. | 434/350 X |
| 6,212,358 B1 | * | 4/2001 | Ho et al. | 434/362 X |
| 6,260,033 B1 | * | 7/2001 | Tatsuoka | 706/45 X |
| 6,287,123 B1 | * | 9/2001 | O'Brien | 434/118 X |
| 6,322,366 B1 | * | 11/2001 | Bergan et al. | 434/118 X |

* cited by examiner

*Primary Examiner*—Joe H. Cheng
*Assistant Examiner*—Chanda Harris
(74) *Attorney, Agent, or Firm*—Thomas L. Bohan; Patricia M. Mathers

(57) ABSTRACT

A learning method to enhance long-term retention of a large number of learned facts or principles. The method presents items to a User repeatedly and, depending on the recall of the User, the time between presentations of a properly recalled item increases. Items being presented for the first time and those presented a subsequent time before being properly answered are designated Unseen Items and O-Level Items, respectively. During each Session, a raw score is assigned to the item (related to the User's ability of recall with the item). When its raw score becomes sufficiently high, the item is considered a P-Level Item, after which it is presented less frequently and the rate of presentation continually decreases as the User demonstrates that he or she knows the correct response for the particular P-Level Item. The number of Sessions that are skipped before the particular P-Level item is re-presented to the User is based on the User's Level L in recalling the correct answer to the item. In this way, known items are repeatedly presented to the User with an ever-increasing interval between presentations. If the User fails to recall the item, the Level of the item is decremented and the time to next presentation decreased. As the User is working with this method, the progress of the User is recorded in a form available for review.

25 Claims, 6 Drawing Sheets

LEARNING METHOD

BACKGROUND OF THE INVENTION

1. Field of the Invention

The present invention relates generally to methods of education and in particular to methods of self-education. More particularly, the present invention relates to a method of teaching oneself a large number of facts or principles about any one of a number of topics. More particularly yet, the present invention relates to such a method that enhances the retention of learned material in long-term memory. Even more particularly, the present invention relates to such a method that incorporates structured repetition of learned material, wherein the time interval between repeated presentations of already-learned material increases after each successful recall of that material, and conversely, wherein that time interval decreases upon an unsuccessful attempt to recall that material. Most particularly, the present invention relates to such a method that automatically optimizes the rules for each individual, determining when new material and previously learned material shall be presented, such a method that produces a continually evolving quantitative evaluation of the user's success in learning the material targeted for acquisition.

2. Description of the Prior Art

Some aspects of teaching have remained relatively unchanged for many years. Nearly every educated person in modern society has experienced a classroom setting in which a teacher directs a group of students through a text about a particular topic. Through the decades, such classroom lessons have sought to instill knowledge through the assignment of individual work, often in the form of homework. After a pre-determined amount of material has been covered, a test is administered to measure the students' retention of and proficiency with that material. After the test, the class moves on to cover new material, devoting no further attention to the already-covered material, with the possible exception of an end-of-term final exam containing a teacher-selected fraction of the material covered during the term.

It has long been observed that the structuring of the traditional educational program reflects a conflict of interest on the part of those maintaining it. By that, it is meant that the bodies such as school boards that have the responsibility for the education of young people have to meet goals that may not be consistent with applying the best teaching methods to the students. The most critical of these goals is to see that the educational program makes the most efficient use of scarce resources. That is, one wishes to develop and administer a program that benefits the greatest number of students affected by it. By its nature, the resulting program best serves the students with an average learning speed, and in so doing will short-change those students who learn at a faster or slower rate than the average. In summary, it is noted that the traditional mass-education program, in teaching an entire group of students at a pace that is optimal for the average student, will fail to recognize that students come to school from a wide range of backgrounds, bringing with them a wide range of learning aptitudes. Unless the individual student's deviation from the norm is large enough to be immediately recognized, teachers generally do not respond to that individual student's unique needs, a situation that might be partially alleviated were there easily obtained measures of each student's progress. The present unsatisfactory approach to the non-average-student's education is becoming increasingly harmful because of the rapidly increasing quantity and diversity of information that a student must assimilate in order to be even moderately well-educated. In passing, it can be noted that a particular student can be an above-average learner in one discipline, average in another, and below-average in a third. Even within a particular discipline, one may learn and retain some material quickly and yet stumble over other types of material, the latter being learned only with much repetition and effort.

The problem set out above is one that has certainly been recognized before. Since at least the 1960s, individualized courses of instruction have been designed with the goal of giving each student the opportunity to learn and to be tested at his or her own pace. Indeed, the phrase "programmed instruction" was coined during that period to refer to that method of instruction wherein the student progresses at his or her own rate. The student is presented with mini-exams every few pages and the results of those mini-exams determine the next set of material that is to be presented to the student. In general, these programmed courses allow the student to leave behind material once he or she has demonstrated a familiarity with it, again with the exception of a comprehensive examination at the end of a portion of the course.

Although programmed instruction was used long before personal computers were available to help implement it, the present ubiquity of such computers has led to their use with such material. For example, Ho et al. (U.S. Pat. No. 5,727, 951; issued Mar. 17, 1998) discloses a computer-aided programmed learning system that allows the student to work at an individual pace. Seifert (U.S. Pat. No. 5,904,485; issued May 18, 1999) also discloses a computer-aided learning system that presents to the student material to be learned and assesses the student's mastery of it. If mastery is lacking, the system of Seifert will present the material in a different way.

The methods disclosed by Ho et al. and Seifert and others of that school of thought all have the drawback that the material to be learned, once mastered, is not presented again. Such approaches ignore the fact that, even though material may be well-learned at one point, it can subsequently be lost. Thus, a drawback inherent in both traditional classroom methods and in traditional programmed instruction (whether computer-based or not) is the failure to allow for a student's memory loss and/or confusion that develops over time following his or her one-time mastery of a certain body of knowledge. This failure is the more striking given the general agreement by researchers that a student is likely to have forgotten a large proportion of learned material within months or even weeks after the material has been "mastered." Such rapid forgetting happens in spite of the fact that human memory is capable of retaining information over decades, indeed over lifetimes of 100 years and more.

To recognize and compensate for a fading memory of learned material, it might be thought that presenting the student periodically with information that he or she has already "learned" might be useful. One effort in this direction is disclosed by Collins et al. (U.S. Pat. No. 5,577,919; issued Nov. 26, 1996), which provides for re-asking questions that have already been answered correctly. In the method of Collins et al. the student is presented with a set of facts and asked to divide it into a first group containing already-known items and a second group containing facts not-as-yet known. A sequence generator then presents a mix of items to the student from the first and second groups. This approach is then repeated, with new material being continually introduced. In this way, there is some re-presentation of already-learned material, and this will have the effect of enhancing the student's long-term retention. The Collins et al. method, however, does not control the frequency with which known facts are re-presented to the student and in particular does not respond to the level of proficiency being demonstrated by the student in responding to the repeated presentation of questions.

Therefore, what is needed is a method of instruction that allows a student to learn at his or her own pace and that leads to longer retention of that which was once learned, be it in school, in on-the-job training, or while the student is working on his or her own. What is also needed is such a method that can provide the student or the student's teacher with a quantitative measure of the student's progress in learning particular items.

SUMMARY OF THE INVENTION

It is an objective of the present invention to provide a programmed method that will allow a student to work at his or her own individual pace and that enhances long-term retention of learned items to a greater extent than provided by traditional programmed instruction. It is a further objective of the present invention to provide such a method that will generate a quantitative measure of the student's progress with respect to individual items being studied.

The present invention achieves the first of its objectives through a method of instruction that presents previously learned items to the student at a repetition rate that reflects the proficiency the student has shown in his or her knowledge of those items. In particular, the method of the present invention questions the student on previously learned items with a frequency that is inversely related to the student's demonstrated proficiency in remembering those items. The present invention achieves the second of its objectives by analyzing this same demonstrated proficiency and storing the results of that analysis for review by the student or his or her teacher.

The method of the present invention can be directed at learning (memorizing) lists of factual information. It can also be used to develop skill in rule-manipulation that is often referred to as "problem solving" and to develop a demonstrable proficiency in the knowledge of scientific concepts. Nevertheless, for definitiveness, most the following discussion will envision the information to be learned to consist of a list of facts rather than principles or problems to be solved. Here, the associated questions, then, require only short factual answers. The questions presented or to be presented will be referred to as "questions" or "items." The response given by the user will be referred to as a "response" or "answer." The method will occasionally be referred to as including a "Program." This Program will be whatever moves the user and the test material through the various steps necessary to apply the method.

The person using the method of the present invention will be referred to herein as the "user" or the "student." A person working with or overseeing the student's efforts will be referred to as the "teacher" or the "proctor." For definitiveness and simplicity, this initial discussion will be predicated on there being a single session each day.

Archetypal examples of the first type of targeted learning (assimilating lists of facts) would be (1) solar system facts (e.g., masses of the sun and all the planets, distances between the solar system objects, materials comprising the planets and their moons, etc.), (2) geopolitical facts about the countries of the world, (3) breeds of dogs, (4) the periodic table including oxidation potentials of atoms, etc.

Obviously, there is no end to such lists; the choice of the particular ones over which mastery will be attempted by a particular individual will depend on that individual's personal interests and/or obligations. In such an application, the material presented will consist of simple questions requiring straightforward factual answers. The format of the questions can be, alternatively, (1) simple text in the language of the user, (2) language-independent images, or (3) any other means by which a question can be conveyed to a user. For that matter, the question may be conveyed by a combination of such forms. The choice will in part be determined by the nature of the list of facts being dealt with. In the dog-breeds example, the image of a representative of a particular breed would probably be the best way of determining whether the user can recognize and name that particular breed.

Pursuing further the variety of means by which questions are presented in the method and answers given by the user, it is noted that modern electronic techniques, including those currently under development, vastly expand the range of these means. As a simple extension of the means discussed above, consider a computer-based approach to giving hints in the context of a list of geopolitical facts about the world's countries, and in particular the item: What is the capital of France? The question could be presented in exactly that textual form. On the other hand, it might be presented by showing the user a map of France, with the location of Paris marked; it might be presented by showing one or more photographs taken within the City of Paris, starting with general street scenes and leading up to an image of Notre Dame or the Eiffel Tower. Concurrently or alternatively, the computer system used for applying the method could generate the music for "April in Paris," or smells characteristic of Les Halles, and so on. Answers could be conveyed by the user via a keyboard, via a spoken word or words, and even, perhaps (in the future) by his or her brain waves being sensed by one of the peripheral components of the computer. Alternatively, in the case of questions dealing with the parts of an automobile engine, the correct response required to: Where is the carburetor? could be given by moving and clicking the computer mouse appropriately, and similarly for pointing out the parts of the human brain, in another type of list.

The heart of the present invention lies in its protocol for determining how frequently items that have already been answered successfully will be re-presented to the student. In this regard, the simplest embodiment of the present invention can be described as follows.

The first step in applying the method is to choose the master collection ("collection") of items to be learned. At the first session the method will select from this collection of items in an order predetermined by the creator of the collection. Since by definition it is the first session, none of these items will have been presented before. Assume that the student works until N items have been seen, and that he or she responds well to M of the N items. Those M items will then be labeled in such a manner that they will not be asked until the next session, Session 2.

In the second session, first the M items answered well during the first session will be presented, and then the N-M items not answered well will be presented.

Of the M items first presented during the second session, assume that P are well-answered. Those P are then labeled so that they will not be re-asked on the third session but will be asked (presented) on the fourth. Assume that the remaining M-P items are answered only moderately well. They will be labeled so as to be re-asked on the third session. In this way, items that are well-answered are seen less and less often.

The time-ordering of the different categories of items on the second session, as discussed above, is reflective of the pattern that is most desirable to follow. It is important (though not a limiting element of the method of the present invention) that the items scheduled for re-asking at a particular session be presented prior to those not so queued. This is because of the importance of reinforcing the knowledge of those items and the fact that it is impossible to predict when a session is to be prematurely terminated. (The items that have never been asked have the lowest priority, and are reserved for the end of a given session.)

It is envisioned that the user will continue with an item until it is answered correctly; only then can he or she move on to the next item. Also, as part of this method, there will in general be available to the user a mode, call it a "dictionary mode" in which the entire collection of items can be reviewed along with their correct responses.

In order to discuss the method of the present invention in somewhat more general terms, several more terms will be defined. "Negative-Level"("N-Level") Items or "Unseen items" will be those that have never been presented, and have $L=-1$. "0-Level" items are those that have been presented but have not been answered well enough to be queued for presentation in some future session, and have $L=0$. Finally, "Positive-Level" ("P-Level") items or "Queued" Items are defined as those items that are to be asked in a particular session, and have $L \geq 0$. In the context of these definitions, when the method is first applied to a new collection of items, all of the items in the collection are Unseen items. Gradually, as the student answers the items, they are shifted to the collection of 0-Level items and, if answered proficiently, to the collection of P-Level items.

Each item in the set of P-Level items has associated with it both a "time to next presentation" (coded by means of a variable called the "Level," or "L"), and a session on which it is to be tested (its "Session to Test," or "StoT"). If an item from that set is presented to the user, there are three possible outcomes. A poor response will result in the time to next presentation being cut in half, a response with medium accuracy will result in no change to that time, and a highly-accurate response will double the time to next presentation.

Although for the basic method of the present application to be applied, it is not necessary to adhere to this "powers-of-two" approach, this is a particularly convenient means of spacing out the re-asking of items in the P-Level collection. It is to be noted that each P-Level item, after being re-asked, may be labeled so as to be asked more frequently, less frequently, or remain unchanged.

All items, even those that are extremely simple, have associated with them an additional parameter, namely the "Score" of the particular item (always vis a vis the particular user, of course). In order to provide even more flexibility to the discussion, a raw score $S_R$ and a weighted score $S_w$ will be introduced. In this context, $S_R$ is the score assigned to an item as a result of the user's answer at a particular time and $S_w$ is the score that the item receives once it is combined in some way with the $S_w$ that the item had prior to being asked that time.

The Score, in turn, is used to determine whether L should change, as a function of two thresholds, a lower and an upper threshold. If the value of the weighted score $S_w$ is above the upper threshold, the Level (L) of that item will be increased; should $S_w$ fall between the upper and lower threshold L will remain constant, and should $S_w$ fall below the lower threshold as the result of poor performance by the user during a particular presentation, L will be decreased. If L decreases to zero the item will be moved back into the set of 0-Level items.

In order to be a bit more quantitative with respect to the embodiment of the method wherein the a particular P-Level Item is re-asked every second, every fourth, every eighth, ... every "$2^s$ th" session (L=1, 2, 3 . . . .), one might define a quantity T that is equal to the number of sessions that must elapse until the particular item is re-asked.

$$T=\{2^{L-1}-1\},$$

where L=1, 2, 3, . . . for a given P-Level Item. Thus for a P-Level Item having a Level of L=2, one session will be skipped between each time that the particular P-Level Item is asked. Similarly, if the Level for a particular P-Level Item is 8, then T=255, meaning that 255 sessions will pass before that particular P-Level Item is re-asked. If (as a result of one or more sessions in which a P-Level Item was not answered sufficiently correctly) L for that P-Level Item has fallen to 0, that item is no longer treated as a P-Level Item.

Now combine the concept of a P-Level Item's score and its Level L. To be specific, one embodiment of the method has scoring as follows. A Score of 1000 is assigned to each P-Level Item being presented. Assume, then, that a completely correct answer leaves the P-Level item's Score at 1000, that a completely incorrect answer reduces it to 0, and that partial credit can lead to any Score between 0 and 1000. Assume further that there exists a set of rules in this embodiment such that any item emerging from being presented with a Score of 800 or higher has its Level L incremented by unity, with a score of 699 or less has its Level L (given that L>0) decremented by unity, and with any score in between has its L value unchanged. Consider, in that embodiment, a P-Level Item being presented with L=8. If it emerges with a Score of 800 or higher, its L will increase to 9, meaning that 255 sessions will pass before the Item is re-presented; if the Score is 699 or less, its L will decrease to 7, meaning that only 63 sessions will pass before this particular P-Level Item is re-presented; and for a Score between 700 and 799, L remains unchanged and the Item will be re-presented after 127 sessions have passed.

In a variant on the just-described embodiment, the score of a P-Level Item can be weighted by the scores of that P-Level Item at the ends of all previous presentations.

As part of the approach just described, one may assign a starting score of zero to an Unseen Item, only giving it a Level L and a T value once its score at the end of a particular presentation rises above a particular threshold level. Once the threshold score has been attained for an item, it is re-classified as a P-Level Item and is assigned a Level of 1.

Note that within the context of the above commentary, once an item has reached the threshold score and a Level L of 1, then, if this item (now a P-Level Item) is correctly answered the next time it is presented, L is again increased by 1. Consider a P-Level Item that has been correctly recalled each of three times it was re-presented (after the threshold score had been attained). It now has a Level L of 4, meaning that $T=\{2^3-1\}=7$. I.e., seven sessions will pass before it is re-presented. Alternatively stated, the P-Level Item will next be presented on the eighth session following the session in which its L value was increased to 4. The P-Level Item's Level L continues to increase as the user continues to give the correct answer each time that that P-Level Item is presented and, consequently, the number of sessions between the current session and the next time the Item is presented increases geometrically. In contrast, the student's failure to answer the P-Level Item correctly will cause its L to decrease. If, after its L has fallen to unity, the user again fails to respond correctly to the P-Level Item, the item in question will be placed in the set of 0-Level items and presented according to other rules.

Although the method of the present invention is not necessarily a computer-based method, the method's scope is certainly expanded by the use of a personal computer or a computer terminal within a larger computer network. Needless to say, the use of a computer offers great advantages in managing the necessary calculations and bookkeeping tasks required for effective presentation of the Items and evaluations of their scores and of overall scores for the user. If a computer is used, some means of communication or interface between the computer and the user is necessary. The computer must be able to present questions either implicitly or explicitly to the user, and the user must have some means of providing the answer. The computer may present some combination of text, images, sounds (including music), smells, tastes, or any other modality to which the user can respond. The interface between computer and user may involve a keyboard, computer mouse, touch screen, voice recognition, or any other means of communication, including brain waves, small muscle movements or eye movements. A natural language interface may be feasible if the interface employs text or voice.

As alluded to previously, rules are employed that govern the selection of Items to be presented in a given session. For example, P-Level Items are presented before 0-Level Items, and P-Level Items with lower levels are presented before those with higher levels. Unseen Items would normally be selected for presentation based on a logical order rule specific to the collection (e.g., using the earlier example of facts about the solar system, items dealing with the identity of the planets would be presented before items dealing with the chemical composition of individual planets), and a rule determines when a session number can be incremented. The purpose of these rules is to organize and present material to be learned so as to first enhance recall of material (P-Level Items) already in the user's memory before presenting 0-Level Items, which in turn are presented prior to new material (Unseen Items) to be learned, and also to present material in a way that will complement other learning materials, such as a textbook.

It is possible to use other means to apply the method of the present invention; means such as flash cards with an indexing system, for example, can be used to present the items and to place items into the appropriate sets.

The present invention is a method of presenting material to be learned to a user in such a manner that new or not-yet-mastered material is presented to the user repeatedly until the user has attained a threshold degree of mastery of it. The "mastered" material is then presented with ever-decreasing frequency, as long as the user continues to recall it. Thus, the user is queried on new and not-yet-mastered material at a relatively high frequency (in terms of sessions) and queried on old and mastered material in ever-decreasing frequency (increasing time intervals). This method of reiterative presentation of material that the user has demonstrated that he or she has learned enhances long-term retention. The method allows a student to work at his or her own pace. Furthermore, the method is efficient in that it presents the student with material that is not-yet-learned and does not unnecessarily present already-learned material, other than at controlled intervals as a means of enhancing long-term retention of that material. A complementary feature of the present invention is its score-keeping and performance tabulation permitting the student or the student's teacher to monitor the student's performance.

BRIEF DESCRIPTION OF THE DRAWINGS

FIG. 5 illustrates qualitatively the frequency of presentation of a particular item over time, as it moves from one set to the next, given that it is well responded to.

DETAILED DESCRIPTION OF THE PREFERRED EMBODIMENT

Figure 1:
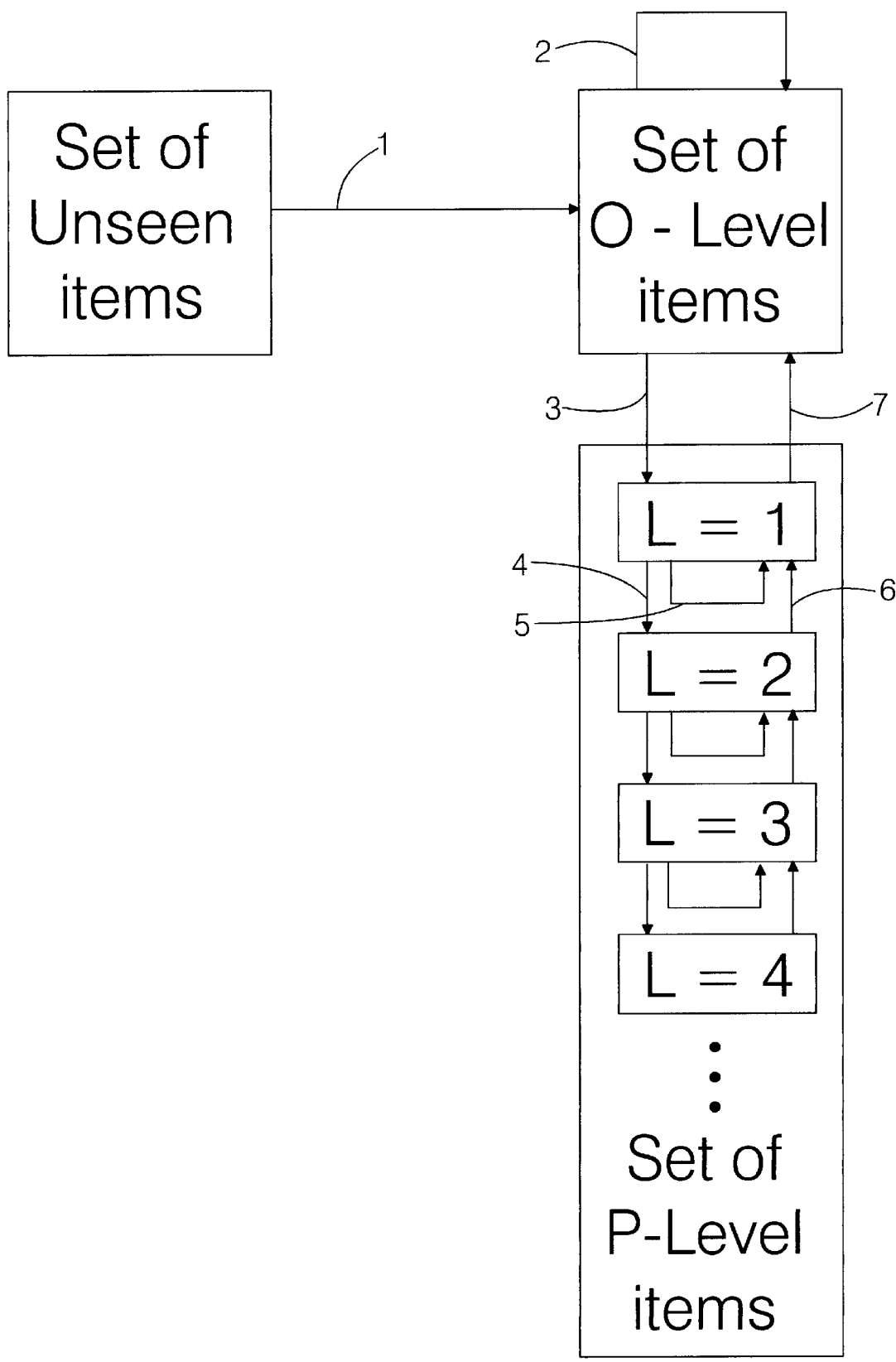
FIG. 1 blocks out the flow among the set of Unseen items, the set of 0-Level items, and the set of P-Level items, all as mediated by the responses of the user.

In the Preferred Embodiment of the present invention a computer program ("the Program") running on either a personal computer or on a computer network is used for presentation of the items to the user/student. The user interacts with the computer through an interface (not shown) that may consist of a keyboard, mouse, or some combination of keyboard and mouse. FIG. 1 is a general illustration of the flow of items as they are presented to the user in the present invention.

The learning takes place in a series of Sessions, where Session herein is defined as a set of presentations with a specific Current Session #. There is no limit, other than the length of a day, as to how many Sessions may be initiated each day, except as follows: The Current Session # can only be incremented if all P-Level items due to be presented during that Session have in fact been presented. It is envisioned in the Preferred Embodiment that there will be at least one Session each day. A Session may continue until the Program has presented all of the questions slated to be presented on that particular Session. Alternatively, it may be extended by the User so as to move items from the set of 0-Level items to the set of P-Level items, and/or items from the set of Unseen items to the set of 0-Level items. Regardless of the point that it is terminated, it is still treated as a Session.

Figure 6:
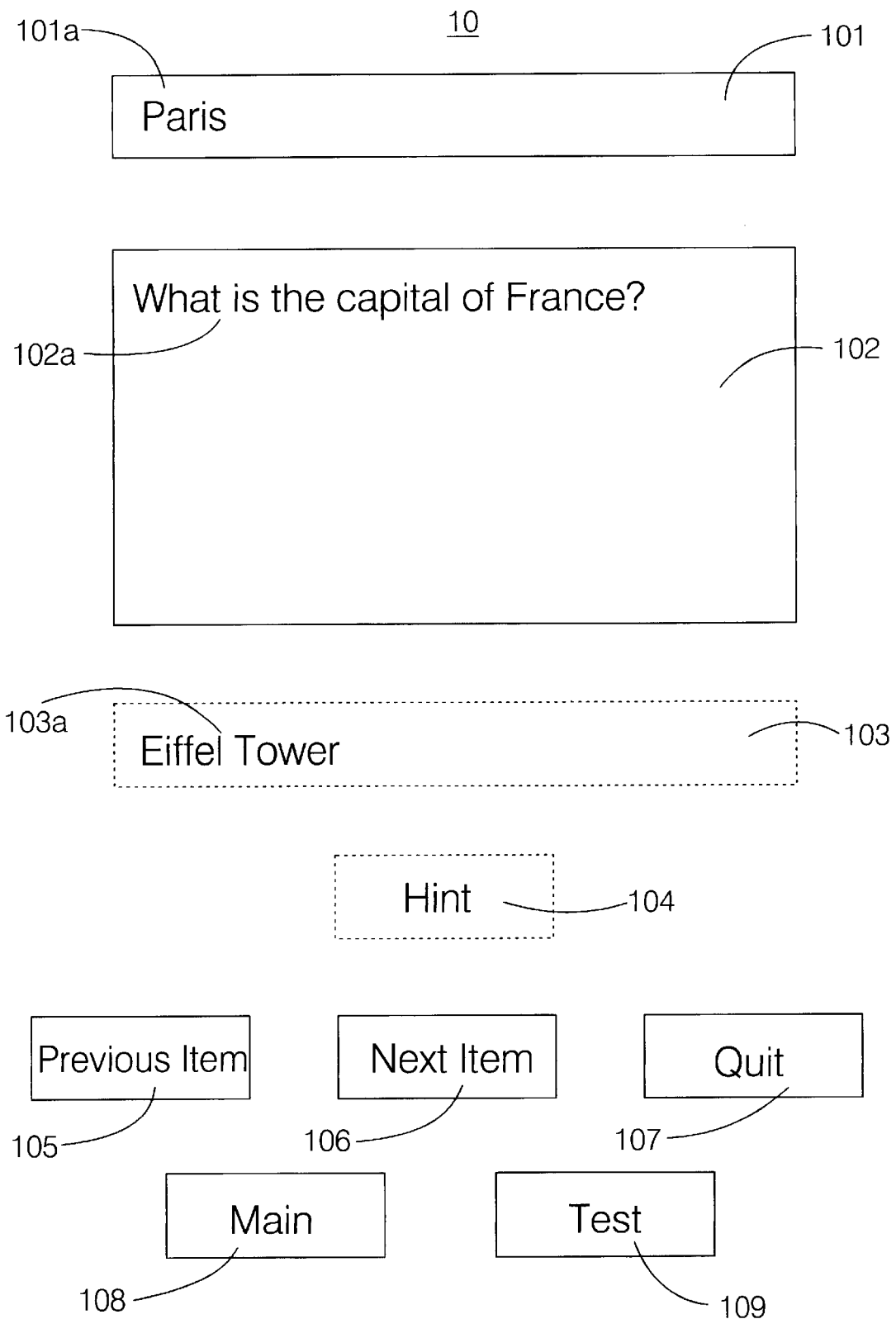
FIG. 6 shows a typical query screen as would be presented to the student/user in the Preferred Embodiment, including the basic fields and selector buttons.

Upon activating the Program, the User sees the computer screen 10 depicted in FIG. 6. The screen 10 contains a blank term field 101, a description field 102 that contains a question, alternately referred to herein as an item 102a (which may be either an Unseen item, a 0-Level Item, or a P-Level Item as those terms have been defined earlier), and a blank hint field 103. For purposes of illustration, a simple test question is shown as the item 102a on the interface 10 in FIG. 6, as is an answer, referred to herein as a response 101a, and a hint 103a. It should be understood, however, that the response 101a and the hint 103a do not appear initially on the computer screen 10. The task of the User is to provide the response 101a to the item 102a. Although, in general, the response to a particular item may be required to be given in a certain way, for example, as a written response, a spoken word or a particular sound, a click of a mouse or a touch of a finger on a particular location on the screen, a particular movement, etc., in the Preferred Embodiment the response is entered via the keyboard. Anything that the User types at this point appears in the term field 101.

As set out in the SUMMARY, the heart of the present invention lies in the protocol that (a) determines which items will be presented to the User during a Session, (b) compares the responses the User to those respective items with the correct responses stored in a database, and (c) determines the frequency with which the individual items are to be re-presented to the User. Also as discussed in the SUMMARY, items fall into one of three main categories: Unseen Items, 0-Level Items, and P-Level Items. P-Level Items are items that have been previously presented to the User and have elicited a sufficiently correct response from the User to cause the Program to move them from the 0-Level-Item bin to the P-Level-Item bin. Unseen Items have not yet been presented, and 0-Level Items have been presented without the User indicating a sufficient knowledge of the answer. As is illustrated in FIG. 1, an item moves from the Unseen-item (or N-Level) set to the 0-Level Level set (when first seen, along path 1), from the 0-Level set back to that set (if its Level=0 and its Score is low or medium, along path 2), from the 0-Level set to the P-Level set (if its Level=0 and its Score is high, along path 3), from one level to the next higher one within the P-Level set (if its Level>0 and its Score is high, along path 4), from one level to the same level within the P-Level set (if its Level >0 and its score is medium, along path 5), from one level to a lower level within the P-Level set (if its Level>1 and its Score is low, along path 6), or from the P-Level set to the 0-Level set (if its Level=1 and its Score is low, along path 7), depending on the user's responses.

In the Preferred Embodiment, the new collection of items will be provided on a CD, from which the Program constructs on a storage medium internal to the computer an Unseen-item Set 200 containing the entire collection, which may number in the thousands of items.

In order to be concrete, what follows is an example that shows how the program might typically operate from the beginning. Note that there is both a state of the system, and, based on that, a process that is implemented. That process, in turn, results in a new state of the system.

One relevant variable, the Score for an item, depends on the number of mistakes made by the user, and the number of hints requested by him or her. In this example, if the Score of an item is below 700 its Level is decremented by 1. If it lies between 700 and 799 its Level remains the same. If it is 800 or above its Level is incremented by 1.

At 1) is shown the initial state of the system. Each item (of which there are nine) has five parameters: (1) an Order in which it will be initially shown, as well as (2) a Score (between 0 and 1000), (3) a Level (−1 or greater), (4) a Session to Test (StoT), the session on which that item will be seen again, and (5) an Intervene #, used to ensure there are items that intervene between one presentation of an item and its next presentation. Because each item's Order remains fixed, the Order may be used to identify each item; thus the item with Order=1 may be called Item 1.

As mentioned previously, each item is located in one of three sets: N-Level items or Unseen items (items which have not been seen, whose level is −1 and whose score is zero), 0-Level items (items which have been seen at least once, whose level is zero but whose score is usually positive), and P-Level items or Queued items (items whose Level is positive and which are queued to be shown to the user on some particular session). Although each item has five parameters associated with it, for simplicity not all of them are shown for all three sets.

Items in the set of Unseen items are ordered by their Order number, those in the set of 0-Level items are ordered according to when they were placed in that set, and those in the set of P-Level items are first ordered according to their Session to Test ("StoT") and secondarily by their Level.

The program determines which item to present to the user as follows. First, if P-Level item with its StoT equal to the Current Session #, that item is shown. Failing the first condition, if there is a 0-Level item with an Intervene # equal to 2 that item is shown. Failing the second condition, if there is an Unseen item then that item is shown.

Current Session #=1

State of system:

|  | Current Session # = 1 State of system: | | | | | | | |
|---|---|---|---|---|---|---|---|---|
|  | Unseen items | | | 0-Level items | | | P-Level items | | |
| 1) | Order | Score | Level | Order | Score | Intervene # | Order | Score | Level | StoT |
|  | 1 | 0 | −1 | | | | | | |
|  | 2 | 0 | −1 | | | | | | |
|  | 3 | 0 | −1 | | | | | | |
|  | 4 | 0 | −1 | | | | | | |
|  | 5 | 0 | −1 | | | | | | |
|  | 6 | 0 | −1 | | | | | | |
|  | 7 | 0 | −1 | | | | | | |
|  | 8 | 0 | −1 | | | | | | |
|  | 9 | 0 | −1 | | | | | | |

At 2), the program determines that there are no P-Level items and no 0-Level items, and so looks at the set of Unseen items. The top one is presented to the user, resulting in a score of 300.

2) Action:

Present: Order=1

Result: Score=300, Level=0.

Because the item with Order=1 shifted to Level=0 it is put into the set of 0-Level items, and the Intervene # is set to 0 so that it will not be seen immediately. Once its Intervene # climbs to 2 is can be shown to the user.

3)

| | Unseen items | | | 0-Level items | | | P-Level items | | |
|---|---|---|---|---|---|---|---|---|---|
| Order | Score | Level | Order | Score | Intervene # | Order | Score | Level | StoT |
| 2 | 0 | −1 | 1 | 300 | 0 | | | | |
| 3 | 0 | −1 | | | | | | | |
| 4 | 0 | −1 | | | | | | | |
| 5 | 0 | −1 | | | | | | | |
| 6 | 0 | −1 | | | | | | | |
| 7 | 0 | −1 | | | | | | | |
| 8 | 0 | −1 | | | | | | | |
| 9 | 0 | −1 | | | | | | | |

At 4) the program determines that there are no P-Level items, and the top item in the set of O-Level items does not have an Intervene # of 2, and so the program looks at the set of Unseen items. The top one is presented to the user, resulting in a score of 500.

4) Present: Order=2

Result: Score=500, Level=0.

Because the item with Order=2 shifted to Level=0 it is put into the set of O-Level items, and the Intervene # is set to 0 so that it will not be seen immediately. The Intervene # for Item 1 is incremented to 1.

As previously, at 6) the program determines that there are no P-Level items and the top item in the set of O-Level items does not have an Intervene # of 2, and so the program looks at the set of Unseen items. The top one is presented to the user, resulting in a score of 400.

6) Present: Order=3

Result: Score=400, Level=0.

Because the item with Order=3 shifted to Level=0 it is put into the set of O-Level items, and the Intervene # is set to 0 so that it will not be seen immediately. The Intervene #s for Items 1 and 2 are both incremented.

5)

| | Unseen items | | | 0-Level items | | | P-Level items | | |
|---|---|---|---|---|---|---|---|---|---|
| Order | Score | Level | Order | Score | Intervene # | Order | Score | Level | StoT |
| 3 | 0 | −1 | 1 | 300 | 1 | | | | |
| 4 | 0 | −1 | 2 | 500 | 0 | | | | |
| 5 | 0 | −1 | | | | | | | |
| 6 | 0 | −1 | | | | | | | |
| 7 | 0 | −1 | | | | | | | |
| 8 | 0 | −1 | | | | | | | |
| 9 | 0 | −1 | | | | | | | |

|  | Unseen items | | | 0-Level items | | | P-Level items | | | |
|---|---|---|---|---|---|---|---|---|---|---|
| 7) | Order | Score | Level | Order | Score | Intervene # | Order | Score | Level | StoT |
|  | 4 | 0 | −1 | 1 | 300 | 2 |  |  |  |  |
|  | 5 | 0 | −1 | 2 | 500 | 1 |  |  |  |  |
|  | 6 | 0 | −1 | 3 | 400 | 0 |  |  |  |  |
|  | 7 | 0 | −1 |  |  |  |  |  |  |  |
|  | 8 | 0 | −1 |  |  |  |  |  |  |  |
|  | 9 | 0 | −1 |  |  |  |  |  |  |  |

At 8) the program determines that there are no P-Level items, but now the top item in the set of O-Level items does have an Intervene # of 2, and so the program presents Item 1, resulting in a score of 900.

8) Present: Order=1

Result: Score=900, Level=1, Sess to Test=2.

At 9), because the Score for Item 1 is 800 or greater, the Level is incremented from 0 to 1, and Session to Test (StoT) is set to the Current Session #+2^(Level-1 ), or 1+1,=2. Because the Level of Item 1 is greater than 0 that item is placed in the set of P-Level items. The Intervene #s for items 2 and 3 are incremented.

As previously, at 10) the program determines that there are no P-Level items to be shown (i.e., no P-Level items have a StoT=1, where 1 is the Current Session #), and so the program looks at the set of O-Level items. The top one (Item 2), previously seen this session, has an Intervene # of 2 and so is presented to the user, resulting in a score of 850.

10) Present: Order=2

Result: Score=850, Level=1, Sess to Test=1.

At 11), because the Score is 800 or greater, the Level for Item 2 is incremented from 0 to 1, and Session to Test (StoT) is set to the Current Session #+2^(Level - 1), or 1+1,=2. Because the Level of Item 2 is greater than 0 that item is placed in the set of P-Level items. The Intervene # for item 3 is incremented.

|  | Unseen items | | | 0-Level items | | | P-Level items | | | |
|---|---|---|---|---|---|---|---|---|---|---|
| 9) | Order | Score | Level | Order | Score | Intervene # | Order | Score | Level | StoT |
|  | 4 | 0 | −1 | 2 | 500 | 2 | 1 | 900 | 1 | 2 |
|  | 5 | 0 | −1 | 3 | 400 | 1 |  |  |  |  |
|  | 6 | 0 | −1 |  |  |  |  |  |  |  |
|  | 7 | 0 | −1 |  |  |  |  |  |  |  |
|  | 8 | 0 | −1 |  |  |  |  |  |  |  |
|  | 9 | 0 | −1 |  |  |  |  |  |  |  |

11)

| Unseen items | | | 0-Level items | | | P-Level items | | | |
|---|---|---|---|---|---|---|---|---|---|
| Order | Score | Level | Order | Score | Intervene # | Order | Score | Level | StoT |
| 4 | 0 | −1 | 3 | 400 | 2 | 1 | 900 | 1 | 2 |
| 5 | 0 | −1 | | | | 2 | 850 | 1 | 2 |
| 6 | 0 | −1 | | | | | | | |
| 7 | 0 | −1 | | | | | | | |
| 8 | 0 | −1 | | | | | | | |
| 9 | 0 | −1 | | | | | | | |

The user can increment the Current Session # as long as there are no items in the P-Level set queued to be seen during the current session. At 12) the user increments the session number to Current Session #=2.

12) Current Session # incremented to 2.

The state of the system is the same as 11) above.

At 13), the program determines that there is at least one P-Level item with StoT equal to the Current Session # (2 in this case), and so that item (Order=1) is presented to the user.

13) Present: Order=1

Result: Score=950, Level=2, Sess to Test=4

At 14), because the Score is 800 or greater, the Level for Item 1 is incremented from 1 to 2, and Session to Test is set to the Current Session #+2^(Level-1), or 2+2,=4. The Intervene # for Item 3 remains at the maximum value of 2.

14)

| Unseen items | | | 0-Level items | | | P-Level items | | | |
|---|---|---|---|---|---|---|---|---|---|
| Order | Score | Level | Order | Score | Intervene # | Order | Score | Level | StoT |
| 4 | 0 | −1 | 3 | 400 | 2 | 2 | 850 | 1 | 2 |
| 5 | 0 | −1 | | | | 1 | 950 | 2 | 4 |
| 6 | 0 | −1 | | | | | | | |
| 7 | 0 | −1 | | | | | | | |
| 8 | 0 | −1 | | | | | | | |
| 9 | 0 | −1 | | | | | | | |

At 15), the program determines that there is at least one P-Level item with StoT equal to the Current Session #, and so that item (Order=2) is presented to the user.

15) Present: Order=2

Result: Score=750, Level=1, Sess to Test=3

At 16), because the Score is above 700 but less than 800, the Level for Item 2 remains at 1, and Session to Test is set to the Current Session #+2^(Level-1), or 2+1,=3.

|  | Unseen items | | | 0-Level items | | | P-Level items | | | |
|---|---|---|---|---|---|---|---|---|---|---|
| 16) | Order | Score | Level | Order | Score | Intervene # | Order | Score | Level | StoT |
|  | 4 | 0 | −1 | 3 | 400 | 2 | 2 | 750 | 1 | 3 |
|  | 5 | 0 | −1 |  |  |  | 1 | 950 | 2 | 4 |
|  | 6 | 0 | −1 |  |  |  |  |  |  |  |
|  | 7 | 0 | −1 |  |  |  |  |  |  |  |
|  | 8 | 0 | −1 |  |  |  |  |  |  |  |
|  | 9 | 0 | −1 |  |  |  |  |  |  |  |

At 17), the program determines that there are no P-Level items to be shown (i.e., none of them has StoT equal to the Current Session #, which is 2), and so looks at the set of O-Level items. The top one has an Intervene # of 2, and so is presented to the user, resulting in a score of 800.

18) Present: Order=3

Result: Score=800, Level=1, Sess to Test=3.

At 18), because the Score is 800 or greater, the Level for Item 3 is incremented from 0 to 1, and Session to Test is set to the Current Session #+2 ^(Level-1), or 2+1,=3. Because the Level of Item 3 is greater than 0 that item is placed in the set of P-Level items.

At 19), the program determines that there are no P-Level items to be shown (i.e., none of them has StoT equal to the Current Session #, which is 2), and there are no O-Level items, and so the program looks at the set of Unseen items. The top one (Order=4) is presented to the user, resulting in a score of 400.

19) Present: Order=4

Result: Score=400, Level=0.

At 20), because the item with Order=4 shifted to Level=0 it is put into the set of O-Level items, and the Intervene # is set to 0 so that it will not be seen immediately.

|  | Unseen items | | | 0-Level items | | | P-Level items | | | |
|---|---|---|---|---|---|---|---|---|---|---|
| 18) | Order | Score | Level | Order | Score | Intervene # | Order | Score | Level | StoT |
|  | 4 | 0 | −1 |  |  |  | 2 | 750 | 1 | 3 |
|  | 5 | 0 | −1 |  |  |  | 3 | 800 | 1 | 3 |
|  | 6 | 0 | −1 |  |  |  | 1 | 950 | 2 | 4 |
|  | 7 | 0 | −1 |  |  |  |  |  |  |  |
|  | 8 | 0 | −1 |  |  |  |  |  |  |  |
|  | 9 | 0 | −1 |  |  |  |  |  |  |  |

| | Unseen items | | | 0-Level items | | | P-Level items | | | |
|---|---|---|---|---|---|---|---|---|---|---|
| 20) | Order | Score | Level | Order | Score | Intervene # | Order | Score | Level | StoT |
| | 5 | 0 | −1 | 4 | 400 | 0 | 2 | 750 | 1 | 3 |
| | 6 | 0 | −1 | | | | 3 | 800 | 1 | 3 |
| | 7 | 0 | −1 | | | | 1 | 950 | 2 | 4 |
| | 8 | 0 | −1 | | | | | | | |
| | 9 | 0 | −1 | | | | | | | |

At 21) the User increments the session number to 3.

21) Current Session # incremented to 3.

The state of the system is the same as 20) above.

At 22), the program determines that there is at least one P-Level item with StoT the Current Session # (3 in this case), and so that item (Order=2) is presented to the user.

22) Present: Order=2

Result: Score=350, Level=0

Because the Score of this item (Order=2) is below 600, its Level is decremented from 1 to 0, and that item is placed in the set of 0-Level items. The Intervene # for Item 4 is incremented to 1.

At 24), the program determines that there is at least one P-Level item with StoT equal to the Current Session #, and so that item (Order=3) is presented to the user.

24) Present: Order=3

Result: Score=925, Level=2, Sess to Test=5

At 25), because the Score is 800 or greater, the Level for Item 3 is incremented from 1 to 2, and Session to Test is set to the Current Session #+2^(Level-1), or 3 +2,=5. The Intervene #s for items 4 and 2 are both incremented.

| | Unseen items | | | 0-Level items | | | P-Level items | | | |
|---|---|---|---|---|---|---|---|---|---|---|
| 23) | Order | Score | Level | Order | Score | Intervene # | Order | Score | Level | StoT |
| | 5 | 0 | −1 | 4 | 400 | 1 | 3 | 800 | 1 | 3 |
| | 6 | 0 | −1 | 2 | 350 | 0 | 1 | 950 | 2 | 4 |
| | 7 | 0 | −1 | | | | | | | |
| | 8 | 0 | −1 | | | | | | | |
| | 9 | 0 | −1 | | | | | | | |

| | Unseen items | | | 0-Level items | | | P-Level items | | | |
|---|---|---|---|---|---|---|---|---|---|---|
| 25) | Order | Score | Level | Order | Score | Intervene # | Order | Score | Level | StoT |
| | 5 | 0 | -1 | 4 | 400 | 2 | 1 | 950 | 2 | 4 |
| | 6 | 0 | -1 | 2 | 350 | 1 | 3 | 925 | 2 | 5 |
| | 7 | 0 | -1 | | | | | | | |
| | 8 | 0 | -1 | | | | | | | |
| | 9 | 0 | -1 | | | | | | | |

At 26), the program determines that there are no P-Level items to be shown (i.e., none of them has StoT equal to the Current Session #, which=3), and so looks at the set of 0-Level items. Item 4 has an Intervene # of 2, and so is presented to the user.

26) Present: Order=4

Result: Score=875, Level=1, Sess to Test=4

At 27), because the Score is 800 or greater, the Level for Item 4 is incremented from 0 to 1, and Session to Test is set to the Current Session #+2^(Level -1), or 3+1,=4. Item 4 is placed in the set of P-Level items. The Intervene # for Item 2 is incremented.

| | Unseen items | | | 0-Level items | | | P-Level items | | | |
|---|---|---|---|---|---|---|---|---|---|---|
| 27) | Order | Score | Level | Order | Score | Intervene # | Order | Score | Level | StoT |
| | 5 | 0 | -1 | 2 | 350 | 2 | 1 | 950 | 2 | 4 |
| | 6 | 0 | -1 | | | | 4 | 875 | 1 | 4 |
| | 7 | 0 | -1 | | | | 3 | 925 | 2 | 5 |
| | 8 | 0 | -1 | | | | | | | |
| | 9 | 0 | -1 | | | | | | | |

At 28) the User increments the session number.

28) Current Session # incremented to 4.

The final score S of an item can be calculated according to a number of different rules. In the Preferred Embodiment of the invention, there is a secondary score, designated the "raw score," which is rather like an instantaneous score that an item has during the course of the attempt of the User to respond to it. In the Preferred Embodiment, each item is assigned a raw score of $S_{RAW}=1000$ upon being presented to the user. During the presentation of that item to the User, one hundred points (or some other sub-factor of 1000) is subtracted from $S_{RAW}$ for each hint that is requested and 50 points for each erroneous "guess." There is also the possibility of subtracting points if the latency to respond is significantly above, say, the median latency for that particular user. If, as the result of these subtractions, $S_{RAW}$ for an item falls below zero before the correct answer is given, $S_{RAW}$ is set to zero. In contrast, $S_{RAW}$ will remain at 1000 if the item is answered completely correctly without any hints being requested. The end-of-Presentation raw score $S_{END-RAW}$ is (in the Preferred Embodiment) then averaged with the final score S at the end of the previous presentation, the result being the new final score S that will characterize the item until the next presentation. Such an averaging has the effect of attenuating the changes in the score that can occur in a single presentation. Note that in the Preferred Embodiment, it is a two-presentation running average. Note also that it has no bearing on the raw score $S_{RAW}$ of the item at the start of the next presentation; in the Preferred Embodiment, that assigned raw score is always 1000.

In an alternative embodiment of the present invention, all of the end-of-presentation raw scores $S_{END-RAW}$ an item are retained, and the variation of the resulting list of values for $S_{END-RAW}$ (i.e., the first standard deviation of the list) is used as a factor in determining that item's T value. For example, the final score S following a particular Session could be set equal to the end-of-presentation raw score $S_{END-RAW}$ minus the variance of the raw scores for the item (with suitable scaling factors). This would have the effect of reducing the T value (i.e., shorten the number of Sessions that would elapse before the item came up again) if the User manifested a large variation in his or her ability to respond correctly to the item in question. The rationale for this is the belief that variations in scores indicate somewhat poor memorization of that item, independent of the raw score $S_{END-RAW}$ which the User ended up with for that item at the end of a particular Session.

For purposes of illustration, the item 102a shown in the description field 102 of FIG. 6 is very simple and the correct response 101a is a single word. Similarly, when the correct response is a click of the mouse button on a particular area of an image shown on the computer screen 10, or is, for example, the proper accent when the User is displaying knowledge a foreign language, deviations from a "perfect" answer will result in the end raw score $S_{END-RAW}$ being reduced by a pre-determined amount commensurate with the nature of the item.

The technique by which hints are provided in the method of the present invention can vary widely. In the Preferred Embodiment, it is as follows. FIG. 6 shows a hint-request button 104. If, while a particular item is being presented during a particular Session, the User cannot think of the proper response, he or she can click on a hint-request button 104. This will result in the Program causing part or all of the response to appear in the hint field 103 for a short period of time, on the order of half a second. (This can also be done in an automated fashion without the User needing to activate the hint-request button 104. For example, the Program can present the hint sua sponte should the User fail to give any answer during a predetermined interval after the item is presented, or if the User gives an incorrect answer.) In any case, the user cannot move ahead without responding with the correct answer. The only alternative to so responding is to quit the program. On the other hand, should the User provide the correct response (by typing it in and seeing it appear in the response field 101) the Program gives an indication (e.g., the answer "Paris" is changed to "Paris +++") that this has occurred, and the next item is presented in the Item Field 102 as soon as the user hits the Enter key (or a Next-Item Button 106, shown in FIG. 6 may become enabled). At any point the User can activate a Quit button 107 and exit the Program.

In the Preferred Embodiment of the method of the present invention, the amount of material shown in the hint field 103 depends on the current Level L of the particular item. For an item with an L of −1 or 0 (i.e., an item in either the Unseen or 0-Level Item set 200) the entire correct response would appear as a hint each time the hint button 104 is pressed. As L rises, the proportion of the correct response shown each time the hint button 104 is pressed grows smaller. Assume that the description field 102 contains the item 102a "What is the capital of France?" When the item 102a is first presented, the User, by pressing the hint button 104 would cause the Program to display the hint 103a "Paris" for a short period of time in the hint field 103. After the User has attained for that item an L is greater than zero, the first press of the hint button 104 might show "P", the second press "Pa", the third "Par" (shown as the hint 103a in FIG. 6) and so on, in the hint field 103. Similarly, feedback given for an incorrect response can be made dependent to a degree on the Level L of the item. If, when L=−1 or 0, the User typed "R" when "P" is the first correct letter to the item 102a, a short beep and a left-facing arrow (symbolizing the backspace key) can appear and remain visible until the "R" is deleted. Such feedback can be eliminated when the Level L is greater than zero.

Figure 2:
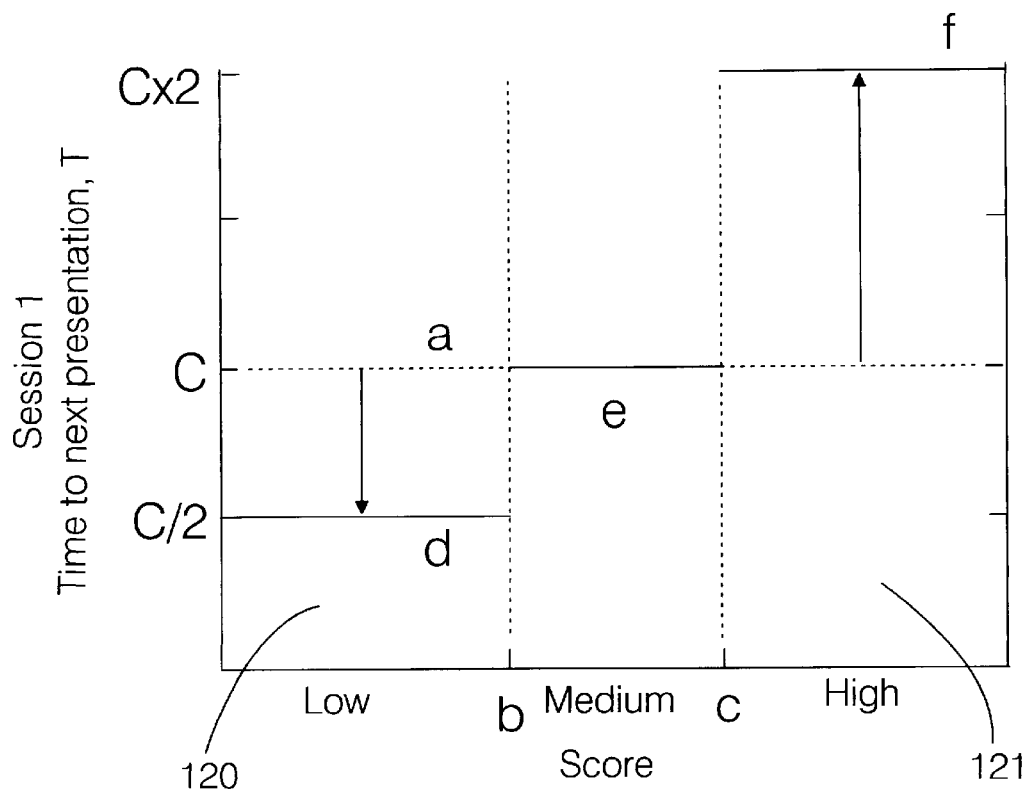
FIG. 2 is an illustration of the time-to-next-presentation based on discrete calculations.

FIG. 2 illustrates a calculation of the Sessions-to-next-presentation T based on discrete values. In this illustration, a P-Level Item is being shown to the User, T representing the Sessions that have elapsed since that P-Level Item was last seen. The dashed line a in FIG. 2 represents the current value for T (i.e., T=e) entering this Session, assumed for definitiveness to be the $8^{th}$ Session since the P-Level Item was last presented to the User. If the User responds in a way that earns him or her a low final score 120 (that is, S is below some threshold shown by b) for the P-Level Item, the Sessions-to-next-presentation parameter T is reduced, to the level shown by the line d in FIG. 2 and the P-Level Item will be next be shown in the $4^{th}$ Session from the current Session (that is, three Sessions will be skipped before it is shown again). If, on the other hand, the User responds in a way that a high score 121 is earned, L is increased from 3 to four and the Sessions-to-next-presentation T, as represented by a line f, increases to 15. Finally, if the final score is medium, there is no change to T.

Figure 3:
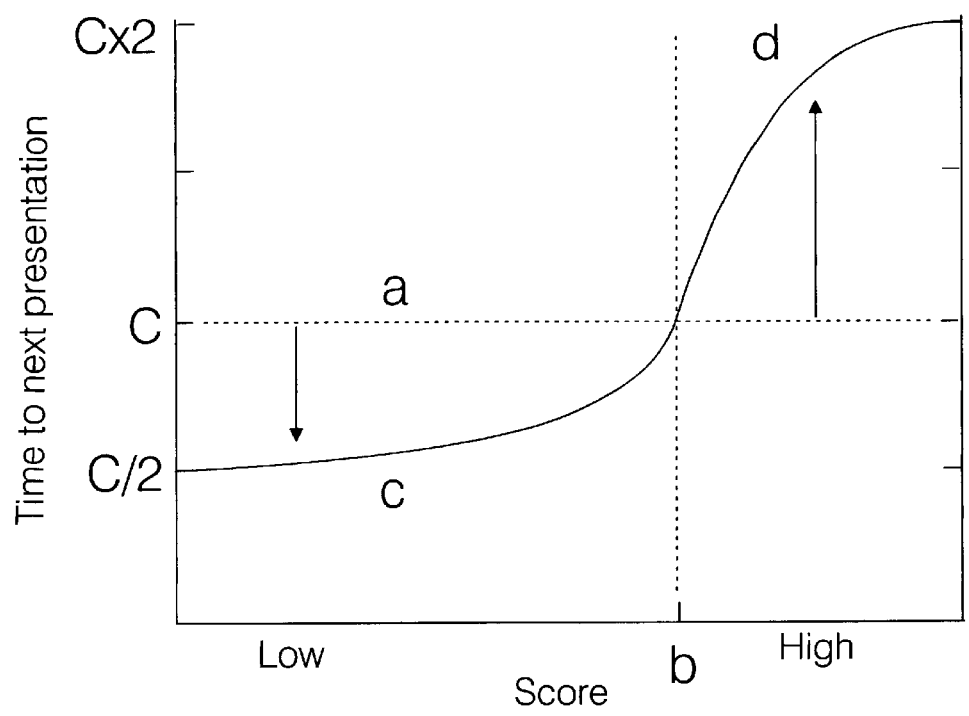
FIG. 3 is an illustration of the time-to-next-presentation based on continuous calculations.

In the Preferred Embodiment of the method of the present invention, the minimum number of score categories is two (low and high) though the total number of such categories can be as high as desired. For example, one may have three categories, low, medium, and high, with medium giving rise to no change in L (and hence T), as is shown in FIG. 2. FIG. 3 illustrates a calculation of the Sessions-to-next-presentation T based on continuous values of the score S. As can be seen in FIG. 3, the more the final score S differs from some value b, the greater the change in T, whether it decreases (as shown by the region c) or increases (as shown by the region d). (It can be seen that in this continuously variable T, L is no longer an integer, if the simple relationship stated earlier between T and L continues to hold.)

FIG. 2 and FIG. 3, with their well-defined functions, may erroneously imply that it is appropriate to use a single rule for determining the Sessions-to-next-presentation T for every User (that is, that this rule results in the optimal learning rate for every User). This is in general not the case. For some, learning might be optimized by a slower decline in the frequency of presentation while, for others, learning might be optimized by a faster decline. In the Preferred Embodiment, the rate-of-learning function can be optimized to better reflect the learning behavior of the particular User. Suppose that, for a particular User, retention is good following an interval of 63 skipped Sessions (T=63), but drops dramatically once that interval rises to 127 Sessions (T=127). The Preferred Embodiment of the present invention has the option of imposing a different protocol for determining T from L, whereby the next value for T after 63 is, instead of 127 following a successful performance after 63, moves to T=127−D (where D may be 10) and then (if it is found that the P-Level Item in question has still not been retained), to T=127−2*D and so on until retention is once again high. In an alternative embodiment, the rate-of-learning function is systematically changed in a random direction by small steps, and the resulting rate of learning recorded. An increase in the rate of learning (as measured by the rate of increase of the number of item in the P-Level-Item Set) leads to a retention of that new value, while a decrease in the rate of learning leads to a rejection of that value. In this way, over the long run this optimization procedure will "home in" on the particular rate of learning that is ideal for each particular User. For example, while the simplest case involves a single rate-of-learning function (as shown in FIG. 2 and FIG. 3), an optimal overall function might involve less than a doubling of the T+1 value (given an entirely correct response) if the Level L was less than 3 at the start of the Session, and more than a doubling of T+1 if L exceeded three at the start of the Session.

Figure 4:
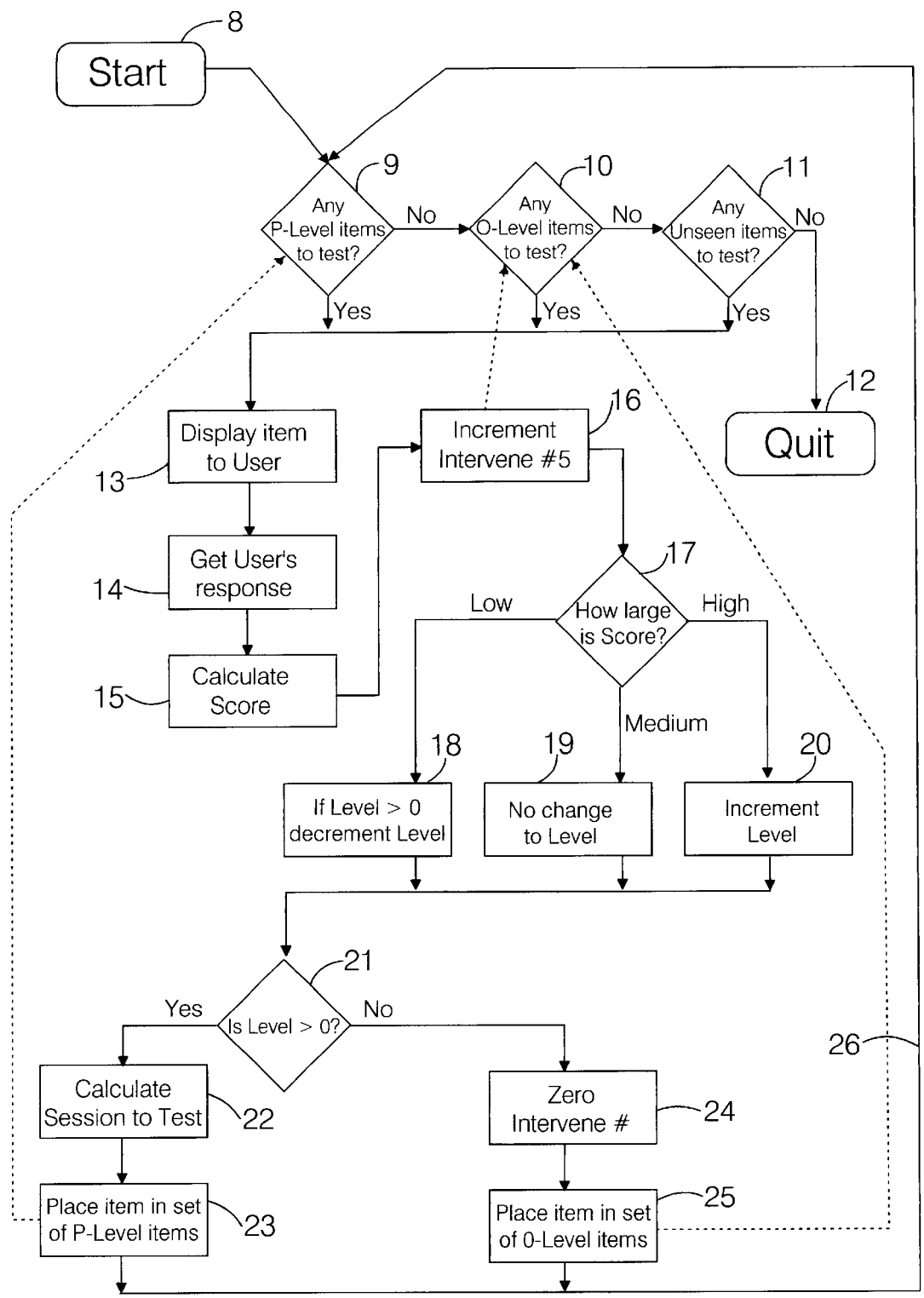
FIG. 4 is a flow chart illustrating the process of presenting items to the user.

FIG. 4 further illustrates the method of the Preferred Embodiment of the present invention. FIG. 4 shows a flow chart illustrating how the Program queries whether there are any P-Level items to test (that is, do any of those items have StoT equal to the Current Session #) (box 9). Failing that test, the Program queries whether there are any O-Level items to test (that is, do any of those items have an Intervene # equal to 2) (box 10). Failing that test, the Program queries whether there are any Unseen items to test (box 11). Failing that test, the Program ends (box 12).

If, on the other hand, there is at least one item due to be tested, it is presented to the User (box 13), a response (including mistakes and hints requested) is recorded (box 14), and a Score calculated (box 15). At this point, any Intervene # below 2 for O-Level items is incremented (box 16), since an item has intervened.

Next, the Program determines whether the Score is low, medium, or high (box 17). If low, and if the Level of that item is greater than zero, its Level is decremented (box 18). If the Score is medium, there is no change to L (box 19), while if it is high L is incremented (box 20).

Next, the Level for that item is tested as to whether it is greater than zero or zero (box 21). If greater than zero, the Session to Test (StoT) is calculated (box 22), and that item is placed in the set of P-Level items (box 23). If the Level is zero, the Intervene # for that item is set to zero (box 24), and that item is placed in the set of O-Level items (box 25). Finally, the program iterates the entire process (path 26).

In addition to rules governing the Level, the protocol can also include a rule to determine the end point of that process. In the Preferred Embodiment, each time an item is answered with a high final score S the Level is increased up to a maximum value of 9, where it can remain. In an alternative embodiment, an item can be considered "well-learned" if the User has given a correct response after not having seen it for a certain pre-determined number of Sessions and at that point the item can be reclassified as a non-test item, and moved to some dead-end set that is nevertheless viewable by the User when operating the Program in its Dictionary Mode. In a further alternative embodiment, L can be unlimited and a learned item can be retained in the P-Level-Item Set 202 for presentation at some future Session.

Figure 5:
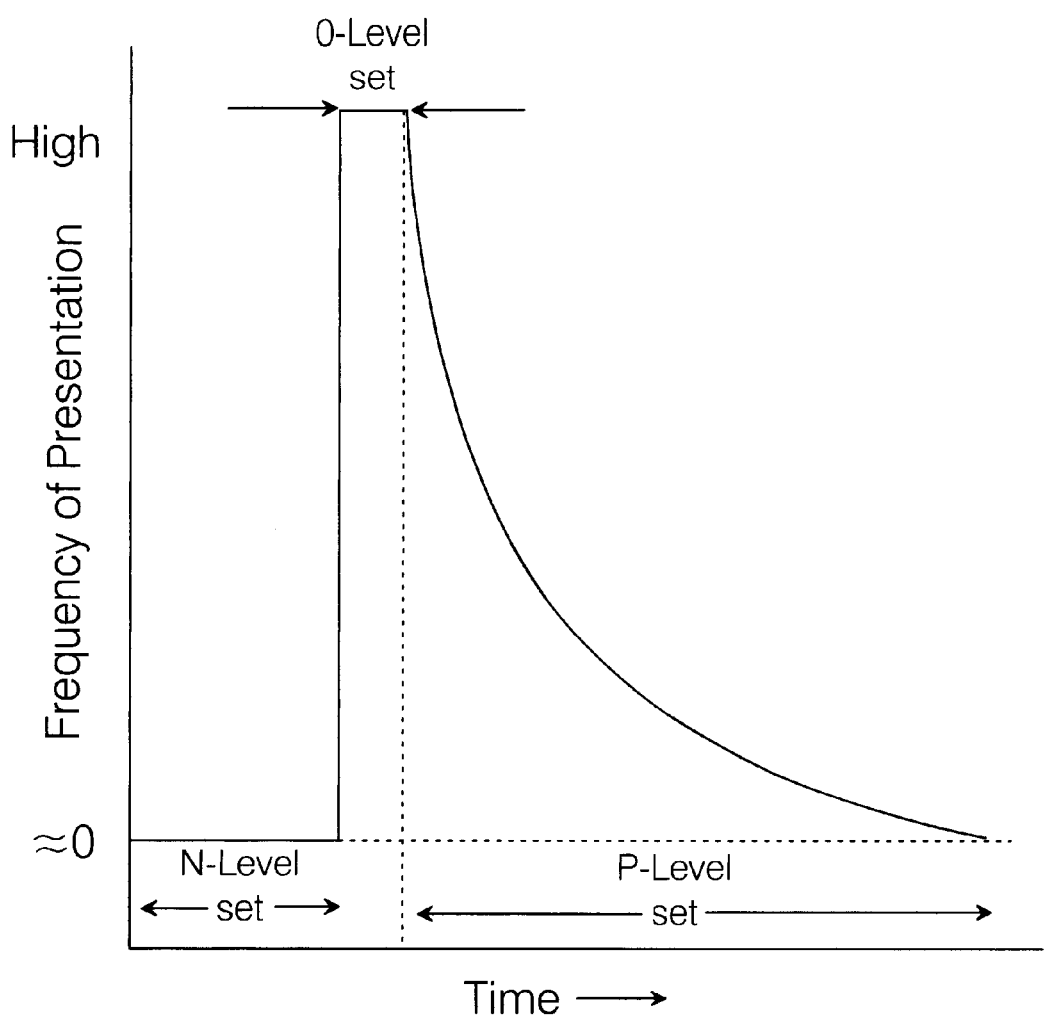

FIG. 5 illustrates how the frequency of presentation of an item that is well-responded to changes over time. While it resides in the set of N-Level items (that is, the set of Unseen Items), its frequency of presentation is essentially zero, except for the one time it is first shown to the user. The item then enters the set of O-Level items and is shown at a high frequency (e.g., several times during a single session). Finally it enters the set of P-Level items and its frequency of presentation declines, approaching some low value. Implicit in FIG. 5 is the solution to a problem facing any process of programmed instruction. Suppose a user wishes to learn tens of thousands of facts (over a number of years, naturally). At maximum he or she can only review, say, a couple of hundred facts a day, so the vast majority must be seen infrequently. FIG. 5 summarizes possibly the only viable solution to this problem: present items to be learned at an initial high frequency which decreases over time if they are responded to with high accuracy.

As alluded to above, there is in the Preferred Embodiment, In addition to the Test mode, Dictionary mode. The User can select the Dictionary mode by pressing the main mode button 108 as illustrated in FIG. 6. This will allow the User to use the database as a dictionary. For example, the User can type part or all of an item in the term field 101 to access the appropriate location of that item in the dictionary database. Clicking on a Previous Item button 105 or a Next Item button 106 on the computer screen 10 shown in FIG. 6 will enable the User to move around the dictionary one item at a time and to peruse items without being tested on them at the moment. Additionally, a window containing a hierarchical tree-structure could provide a more global picture of the entire database. When the program is in Dictionary mode, the hint field 103 and the hint button 104 are disabled. The Dictionary mode would also allow a program administrator (or possibly the User) to add, modify, or delete items (employing buttons not shown). In the Preferred Embodiment, an entry in the dictionary database may or may not be designated as a test item. For example, some entries can consist of a number of paragraphs of text with accompanying images describing some aspect of the world (e.g., one entry might be called "sub-atomic particles"). The program administrator, or possibly the User, can then cull any number of questions from that longer entry and designate the questions as test items (e.g., the description field 102 could contain "This stable sub-atomic particle has a unit positive charge" and the term field 101 could contain "proton"). In the Test mode, the phrase in the description field 102 is the item being tested, and the answer sought, in this case "proton," does not appear in the term field 101. If the word or term that is the correct answer should also appear in the description field 102, it is blanked out during testing. Thus, in the above example, when the Program is in the Dictionary mode, the description field 102 could contain "The proton is a stable sub-atomic particle with a unit positive charge." In the Test mode, the User would see something along the lines of "The **** is a stable sub-atomic particle with unit positive charge." The word "proton" will replace the asterisks when the correct answer is typed into the term field 101**.

Figure 7:
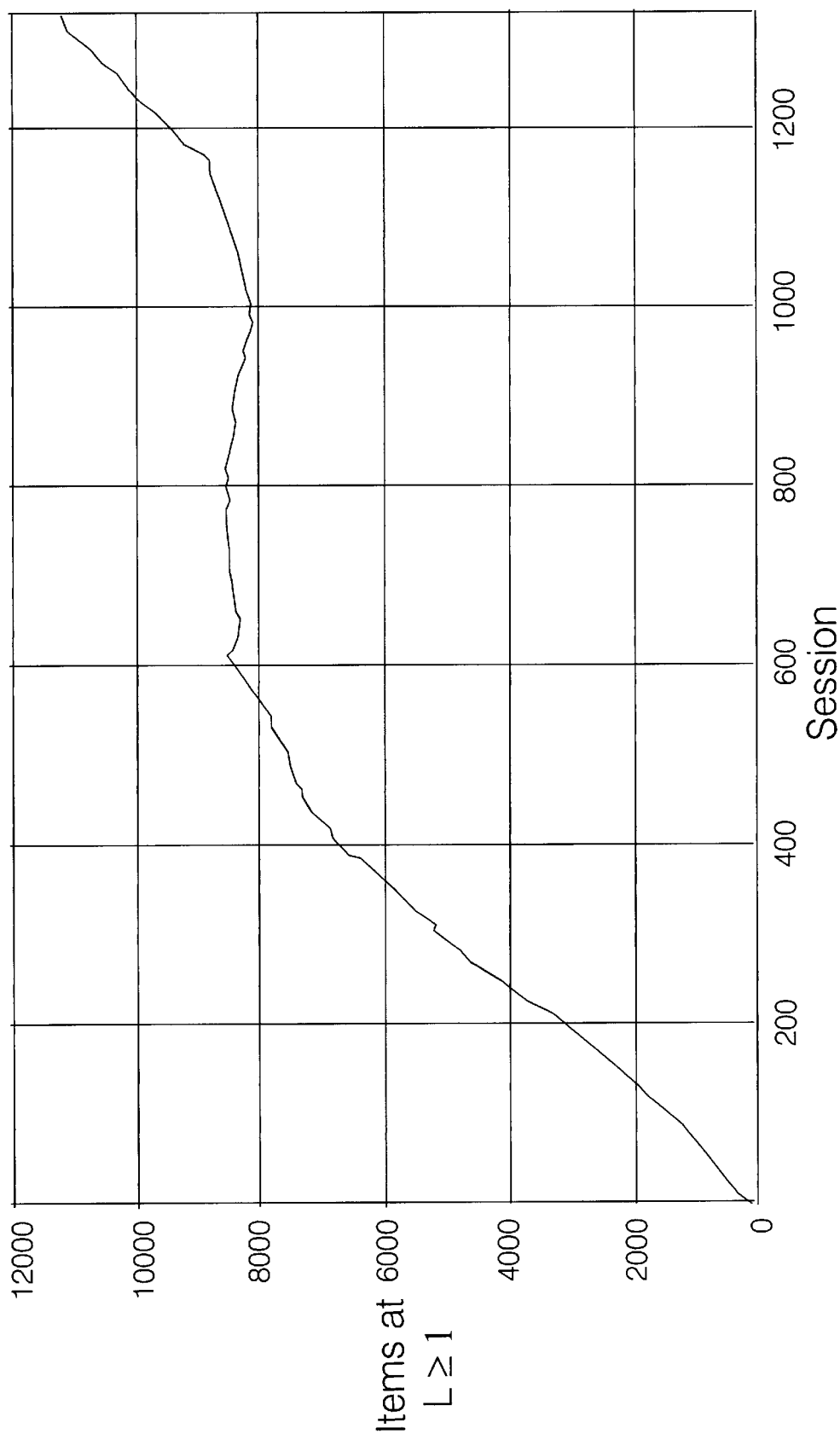
FIG. 7 shows, for one user of the program, the cumulative number of items in the P-Level set as a function of session number.

In the Preferred Embodiment data are automatically collected to depict the learning progress of the User. Those data may be used to create a graph to display, for example, the cumulative number of items in the P-Level-Item Set 202 as a function of time or of Session number, as illustrated in FIG. 7. This graph, in turn, may be used to encourage the student using the program. Alternatively, the data can be viewed by a teacher in order to verify that all of his or her students are progressing at a reasonable rate, or to determine that some students are exhibiting difficulties and may require some appropriate action. Further, data can be collected on each particular item that is tested. If many students find a particular item difficult to learn, the teacher may decide that that item should be broken down into simpler components (and vice-versa for items very easily learned by most students). In this manner the database of test items can be modified over time so that, for most students, items are neither too difficult (and thus discouraging) nor too easy (and thus boring).

While the description of the Preferred Embodiment of the method of the present invention has been provided above, this description is not intended to be, and should not be taken to be, limiting to the scope of the invention disclosed and claimed herein. Furthermore, the details set out in the Preferred Embodiment and in the SUMMARY of the present invention are considered to be merely illustrative of the invention's scope; it is to be understood that numerous changes may be made without straying from the scope of the present invention.

I claim:

1. A learning method for learning items and reinforcing retention of learned items, said method comprising the following steps:

(a) providing a series of items to be learned in a series of sessions;

(b) identifying an individual item of said series of items as one of several item-types that include an as-yet unseen item, an as-yet-partially-learned item, and a well-learned item;

(c) providing a re-presentation rule according to which said individual item presented in a current session is scheduled for re-presentation to said user in a future session, wherein said re-presentation rule ascertains a degree of mastery of said individual item and schedules said re-presentation based on said degree of mastery, wherein one or more sessions may intervene between said current session and said future session;

(d) presenting said individual item to said user;

(e) evaluating a response of said user to said individual item; and (f) determining said future session in which said individual item is to be re-presented to said user, based on said re-presentation rule.

2. The method described in claim 1, said step of classifying said individual item including the steps of:
(a) classifying said as-yet unseen item as an N-Level Item and assigning said N-Level Item to an N-Level Item Set that includes one or more items not yet presented to said user;
(b) classifying said as-yet-partially-learned item as a O-Level Item and assigning said O-Level Item to a O-Level Item Set; and
(c) classifying said well-learned Item as a P-Level Item and assigning said P-Level Item to a P-Level Item Set.

3. The method described in claim 2, wherein said re-presentation rule is based on the steps of further comprising the following steps:
(a) moving one or more N-Level Items to said O-Level Item Set when said N-Level Items are to be presented to said user and reclassifying said one or more N-Level Items as O-Level Items; and
(b) assigning a threshold score to each of said O-Level Items.

4. The method described in claim 3 further comprising the steps of:
(a) presenting said one or more O-Level Items to said user;
(b) evaluating an item-response of said user to a particular O-Level Item of said one or more O-Level Items;
(c) assigning an item-score to said particular O-Level Item, said item-score based on said item-response;
(d) comparing said item-score with said threshold score;
(e) if said item score is greater than said threshold score, moving said particular O-Level Item to a P-Level-Item Set, reclassifying said O-Level Item as a P-Level Item having a Level L, and defining said item-score as a final-item-score;
(f) if said item score is less than said threshold score, scheduling said O-Level Item for re-presentation to said user during said current session after some number of intervening items has been presented to said user; and
(g) if said item score is less than said threshold score when said current session ends, scheduling said O-Level Item for re-presentation to said user in a next session, wherein no sessions intervene between said current session and said next session.

5. The method described in claim 4, where in said re-presentation rule determines a presentation sequence of items to be presented to said user, includable in said sequence being a first presentation sequence of one or more P-Level Items from said P-Level Set wherein said Level L for each said P-Level Item determines a re-presentation interval for each said P-Level Item, a second presentation sequence of one or more O-Level Items, and a third presentation sequence of N-Level Items.

6. The method described in claim 5 further comprising the steps of
(a) presenting said first presentation sequence of said one or more P-Level Items;
(b) determining from user-action whether said current session is to continue after said P-Level Items in said first presentation sequence have all been presented;
(c) presenting said second presentation sequence of said one or more O-Level Items;
(d) determining from said user-action whether said current session is to continue after all O-Level items in said second presentation sequence have been presented; and
(e) presenting said third presentation sequence of said one or more N-Level Items.

7. The method described in claim 1 having a dictionary of terms that includes at least said series of items to be learned, a corresponding definition being provided for each of said terms, and providing two modes of operation, a test mode and a dictionary mode, wherein, in said test mode, said series of items to be learned are test items presented to said user to elicit an item-response, and wherein, in said dictionary mode, said user can browse through said dictionary and view one or more of said terms and said corresponding definition.

8. The method described in claim 7, wherein said dictionary is editable and wherein, during editing of said dictionary, any particular one of said terms, including said test items, is modifiable and deletable from said dictionary, and wherein new terms are includable.

9. The method described in claim 4, wherein said defining said final-item-score further comprises the steps of:
(a) defining a raw score based on a quality of said item-response; and
(b) re-calculating said final-item-score by incorporating said raw score in with a previously existing final-item-score.

10. The method described in claim 4, wherein said threshold score includes a lower threshold score and an upper threshold score, said method further comprising the steps of:
(a) comparing said final-item-score with said upper threshold score and said lower threshold score;
(b) incrementing said Level L each time said final-item-score to said P-Level-Item is greater than said upper threshold score; and
(c) decrementing said Level L each time said final-item-score for said P-Level-Item is lower than said lower threshold score.

11. A learning method in which a master set of items to be learned is presented to a user in a series of sessions, said method comprising the steps of:
(a) ordering a master set of new items to be learned;
(b) presenting a first subset of said master set to a user during a first session;
(c) providing hints for an item-response upon user demand;
(d) evaluating each item-response of said user to a presented item of said first subset; and
(e) ordering said first subset based on said each item-response into a P-Level Set containing P-Level Items and a O-Level Set containing O-Level Items, wherein said P-Level Items are those items having elicited a satisfactory item-response during said first session and said O-Level Items are those items having elicited an unsatisfactory item-response during said first session.

12. The method described in claim 11, comprising the additional steps of:
(a) assigning to all of said P-Level Items an initial Level;
(b) presenting to said user at a second session a first presentation sequence containing all of said P-Level Items, followed by a second presentation sequence containing all of said O-Level Items;
(c) increasing said initial Level to a current higher level for each of said P-Level Items eliciting a sufficiently correct response during said second session, decreasing said initial Level to a current lower level for each of said P-Level Items eliciting a sufficiently poor response during said second session, and defining said initial Level as an unchanged level for each of said P-Level Items eliciting a partially correct response during said second session;

(d) reclassifying all said O-Level Items eliciting a sufficiently correct response during said second session as P-Level Items with an initial Level and moving them to said P-Level Set;

(e) returning to said P-Level Set all said P-Level Items having said current higher level or said unchanged level;

(f) returning to said O-Level Set all said P-Level Items having a current lower level.

13. The method described in claim 12, further comprising the following step:

(a) providing a re-presentation rule for determining a presentation sequence for said items to be presented in a succession of sessions subsequent to said second session, wherein a current Level determines whether said given item from said P-Level Set will be presented during a current session.

14. The method described in claim 13 wherein a variable re-presentation rate for said given item is expressed as a number-of-sessions-to-next-presentation T, wherein said number-of-sessions-to-next-presentation T is calculated from said current Level for said given item.

15. The method described in claim 14 wherein each said item-response that is sufficiently correct causes a sum of one plus said number-of-sessions-to-next-presentation T to double for said given item.

16. The method as described in claim 11 wherein said method is mediated by computer software running on a computer with response input means.

17. The method as described in claim 16 wherein said item-response is a written term and said input means is a keyboard.

18. The method as described in claim 16 wherein said responses are selections and said input means is a mouse.

19. The method described in claim 12 further comprising the steps of:

(a) assigning an upper threshold score and a lower threshold score to each of said P-Level Items; and (b) comparing an item-score for an elicited response to each one of said P-Level Items that is re-presented to said user with said upper threshold score and said lower threshold score of said respective P-Level Item and determining that said elicited response is sufficiently correct if said item-score is greater than said upper threshold score, is sufficiently poor if said item-score is lower than said lower threshold score, and is partially correct if said item-score lies between said upper threshold score and said lower threshold score.

20. The method described in claim 14 wherein said number-of-sessions-to-next-presentation T is equal to $\{2^{(L-1)}-1\}$, and wherein L is equal to said current Level and is an integer equal to or greater than 1.

21. The method as described in claim 14 wherein Level-changing decisions are based on a final-item-score assigned to said given item following a current session, said final-item-score being determined by:

(a) assigning before said current session a perfect raw score;

(b) obtaining an intermediate raw score by subtracting a first decrement of points from said perfect raw score for an incorrect item-response to said given item;

(c) subtracting a second decrement of points from said intermediate raw score ($S_R$) upon user demand for hints; and (d) defining said intermediate raw score to be a final-item-score for an item-responce to said given item that is correct.

22. The method as described in claim 14 further comprising the step of systematically optimizing said sessions-to-next-presentation T by deviating said sessions-to-next-presentation T from an L-determined value when said L-determined value of said sessions-to-next-presentation T is found to result in inferior retention of said given item.

23. The method described in claim 16 wherein each said item-response that is partially correct leaves said number-of-sessions-to-next-presentation T unchanged.

24. The method described in claim 14, wherein each said item-response that is sufficiently poor causes said number-of-sessions-to-next-presentation T to be halved.

25. A computer-based learning method for acquiring and reinforcing knowledge of a mass of information at a rate adaptable to a particular user who will activate the related software program on a regular basis so as to engage in a series of computer-mediated learning sessions, said method comprising the steps of (a) during a first session, selecting from a database of items to be learned certain items-to-be-first-presented;

(b) presenting to said user said items-to-be-first-presented so as to elicit responses from said user;

(c) evaluating said responses;

(d) sorting said items-to-be-first-presented into first P-Level Items placed in a P-Level Set and O-Level Items placed in a O-Level Set, said sorting based one an item-response elicited for each of said items-to-be-first-presented;

(e) assigning to each of said first P-Level Items an Initial Level L;

(f) during a second session, presenting to said user all of said first P-Level Items followed by all of said O-Level Items so as to elicit second responses from said user;

(g) following said second session performing a second sorting, placing said first P-Level Items and said O-Level Items into said P-Level Set and said O-Level Set based on said second responses;

(h) assigning a modified Level L to each of said first P-Level Items returned to said P-Level Set, said modified Level L being incremented for each of said first P-Level Items that elicited a sufficiently correct second response from said user, said modified Level L being decremented for each of said first P-Level Items that elicited a sufficiently poor second response from said user;

(l) assigning to said P-Level Set each of said O-Level Items that elicited a sufficiently correct second response from said user and assigning an Initial Level L to each of said O-Level Items assigned to said P-Level Set;

(m) during a third session, presenting to said user only those of said P-Level items for which said Initial Level L was not incremented during said second session;

(n) defining as timely P-Level Items those of said P-Level Items that have a current Level L equal to a specific predetermined Level L trigger value; and (o) generating within said software a data file containing in graphic and tabular form an itemization of a learning rate for said user on each of said items presented.

* * * * *